US010410455B2

(12) United States Patent
Xu et al.

(10) Patent No.: US 10,410,455 B2
(45) Date of Patent: Sep. 10, 2019

(54) BANKNOTE PROCESSING METHOD AND DEVICE

(71) Applicant: Shandong New Beiyang Information Technology Co., Ltd., Beijing (CN)

(72) Inventors: Chunkai Xu, Shandong (CN); Yanbin Xing, Shandong (CN); Bingqing Liu, Shandong (CN); Lu Sun, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 371 days.

(21) Appl. No.: 15/525,558

(22) PCT Filed: Sep. 23, 2015

(86) PCT No.: PCT/CN2015/090351

§ 371 (c)(1),
(2) Date: May 9, 2017

(87) PCT Pub. No.: WO2016/074535

PCT Pub. Date: May 19, 2016

(65) Prior Publication Data

US 2017/0323506 A1 Nov. 9, 2017

(30) Foreign Application Priority Data

Nov. 10, 2014 (CN) .......................... 2014 1 0629040

(51) Int. Cl.
*G07D 7/128* (2016.01)
*G07D 7/00* (2016.01)
(Continued)

(52) U.S. Cl.
CPC ........... *G07D 7/128* (2013.01); *G06K 9/2027* (2013.01); *G07D 7/00* (2013.01); *G07D 7/2075* (2013.01)

(58) Field of Classification Search
CPC ........ G06K 9/2027; G07D 7/00; G07D 7/128; G07D 7/2075
See application file for complete search history.

(56) References Cited

U.S. PATENT DOCUMENTS

2010/0027080 A1* 2/2010 Hombo .............. H04N 1/00519 358/474
2011/0013238 A1* 1/2011 Kamio ............... H04N 1/00002 358/475
2012/0013952 A1* 1/2012 Shimizu ............. H04N 1/00002 358/448

FOREIGN PATENT DOCUMENTS

CN 101290689 A 10/2008
CN 102105911 A 6/2011
(Continued)

OTHER PUBLICATIONS

International Search Report issued in the International Application No. PCT/CN2015/090351, dated Jan. 7, 2016, 4 pages.

*Primary Examiner* — Manuchehr Rahmjoo
(74) *Attorney, Agent, or Firm* — Wilmer Cutler Pickering Hale and Dorr LLP

(57) ABSTRACT

Disclosed is a banknote processing method and device. The banknote processing method includes: scanning a substrate through the image acquisition module while acquiring banknote image data through an image acquisition module to obtain substrate image data; acquiring a characteristic value of the substrate image data; calculating a change value of the characteristic value of the substrate image data relative to a reference characteristic value; judging whether the change value is greater than a preset threshold value; and configuring parameters of the image acquisition module if it is judged that the change value is greater than the threshold value.

6 Claims, 8 Drawing Sheets

(51) Int. Cl.

| | |
|---|---|
| ***G06K 9/20*** | (2006.01) |
| ***G07D 7/20*** | (2016.01) |

(56) References Cited

FOREIGN PATENT DOCUMENTS

| | | | |
|---|---|---|---|
| CN | 103152510 | A | 6/2013 |
| CN | 103493108 | A | 1/2014 |
| JP | H08-69550 | A | 3/1996 |
| JP | 2009-042921 | A | 2/2009 |

* cited by examiner

BANKNOTE PROCESSING METHOD AND DEVICE

CROSS REFERENCES TO RELATED APPLICATIONS

This application is a United States national phase application of international patent application no. PCT/CN2015/090351, filed on Sep. 23, 2015, which claims priority to Chinese patent application No. 201410629040.2 filed Nov. 10, 2014, both of which are incorporated by reference in their entireties.

TECHNICAL FIELD

The present disclosure relates to the field of banknote processing, and in particular relates to a banknote processing method and device.

BACKGROUND

Banks and other financial institutions usually utilize banknote processing devices such as a banknote counting machine, a banknote sorting machine and the like to authenticate, count or sort banknote. In an existing art, the banknote processing device includes a separating part, configured to gradually separate the stacked banknote one by one; an identification part, configured to identify and count the banknote; and an accumulation part, configured to accumulate the banknote counted by the banknote identification part. Furthermore, the banknote processing device also includes a rejection part which is configured to receive the banknote which is identified by the banknote identification part as rejection.

The banknote identification part includes an image sensor which is configured to acquire a banknote image so as to discriminate the authenticity of the banknote. A common image sensor is a charge-coupled image sensor (abbreviated as CCD) and a contact image sensor (abbreviated as CIS), and both the CCD and the CIS acquire the banknote image by illuminating the banknote through the light of a light source. However, since the number of the banknote to be counted and sorted by the financial institution is large, the banknote processing device generally needs to work continuously for several hours. Consequently, after the banknote processing device continuously works for a long time, the heat generated by the continuous work of a motor and other banknote drive devices enables the temperature of the banknote processing device to be increased continuously, so that the luminous intensity of the image sensor will be obviously changed; moreover, certain electrostatic accumulation may be produced when the banknote continuously pass through a transport passage, and the continuous electrostatic accumulation will also cause the working instability of the image sensor, resulting in a decline of the quality of an image generated by the image sensor and further influencing the banknote identification accuracy.

In the existing art, in order to avoid the problem that the banknote identification rate is obviously declined due to the long-time continuous work of the banknote processing device, the working personnel usually turns off a power supply of the banknote processing device manually after the banknote processing device works for a preset period of time, and enables the banknote processing device to be powered on again after the banknote processing device is powered off for a set period of time. This method not only requires the timing operation of the working personnel, but also requires the banknote processing device to be paused, thereby having the problem of low working efficiency.

An effective solution is not proposed yet for the problem in the existing art that the processing efficiency is relatively low when the banknote identification rate is obviously decreased due to the long-time continuous work of the banknote processing device.

SUMMARY

The present disclosure provides a banknote processing method and device so as to solve the problem in an existing art that the processing efficiency is relatively low when the banknote discriminating rate is obviously decreased due to the long-time continuous work of the banknote processing device.

According to one aspect of the present disclosure, a banknote processing method is provided. The banknote processing method includes: scanning a substrate through an image acquisition module to obtain substrate image data while acquiring banknote image data through the image acquisition module; acquiring a characteristic value of the substrate image data; calculating a change value of the characteristic value of the substrate image data relative to a reference characteristic value; judging whether the change value is greater than a preset threshold value; and configuring parameters of the image acquisition module if it is judged that the change value is greater than the threshold value.

Further, the preset threshold value includes a first threshold value and a second threshold value, where the first threshold value is greater than the second threshold value, the judging whether the change value is greater than the preset threshold value includes: judging whether the change value is greater than the first threshold value; and judging whether the change value is greater than the second threshold value, wherein if it is judged that the change value is greater than the first threshold value, the parameters of the image acquisition module are configured by resetting the image acquisition module, and if it is judged that the change value is greater than the second threshold value and less than or equal to the first threshold value, the parameters of the image acquisition module are configured by correcting the image acquisition module.

Further, the image acquisition module includes an image sensor and an A/D converter; where the A/D converter is configured to convert an analog image signal generated by the image sensor into digital image data, and the parameters of the image acquisition module include: an illuminating time of the image sensor; and/or an amplification factor of the A/D converter.

Further, the image acquisition module is reset in the following way: turning off power supplies of the image sensor and the A/D converter; turning on the power supplies of the image sensor and the A/D converter; and reconfiguring the amplification factor of the A/D converter and/or reconfiguring the illuminating time of the image sensor.

Further, the image acquisition module is corrected in the following way: setting the illuminating time of the image sensor as an initial illuminating time; calculating the characteristic value of the substrate image data to obtain a current characteristic value when the illuminating time of the image sensor is the initial illuminating time; judging whether the change value of the current characteristic value relative to the reference characteristic value is greater than a preset deviation threshold value; adjusting the illuminating time of the image sensor if it is judged that the change value of the current characteristic value relative to the reference characteristic value is greater than the preset deviation threshold value; and storing the current illuminating time of the image sensor if it is judged that the change value of the current characteristic value relative to the reference characteristic value is less than or equal to the preset deviation threshold value.

Further, the banknote processing method is used for successively scanning a first banknote and a second banknote through the image acquisition module, where the first banknote is scanned while the substrate is scanned by the image acquisition module, and after judging whether the change value is greater than the threshold value, the method further includes: stopping transportation of the second banknote if it is judged that the change value is greater than the threshold value; and continuing transportation of the second banknote if it is judged that the change value is less than or equal to the threshold value.

Further, the calculating the change value of the characteristic value of the substrate image data relative to the reference characteristic value includes: calculating a difference value between the characteristic value of the substrate image data and the reference characteristic value; or calculating a ratio of the difference value between the characteristic value of the substrate image data and the reference characteristic value to the reference characteristic value.

According to another aspect of the present disclosure, a banknote processing device is provided. The banknote processing device includes: a banknote transport passage; a transport mechanism, configured to drive banknote to move in the banknote transport passage; a discrimination mechanism including an image acquisition module which includes an image sensor and an A/D converter, where the image sensor includes a banknote scanning region and a reference scanning region, the banknote scanning region corresponds to a position of banknote in the banknote transport passage, and the reference scanning region corresponds to a position of a substrate; and a controller, configured to control the image acquisition module to acquire banknote image data and simultaneously to control the image acquisition module to scan the substrate to obtain substrate image data, acquire a characteristic value of the substrate image data and a reference characteristic value, calculate a change value of the characteristic value of the substrate image data relative to the reference characteristic value, judge whether the change value is greater than a preset threshold value, and configure parameters of the image acquisition module when it is judged that the change value is greater than the preset threshold value.

Further, the preset threshold value includes a first threshold value and a second threshold value; where the first threshold value is greater than the second threshold value; the controller is configured to judge whether the change value is greater than the first threshold value and whether the change value is greater than the second threshold value, configure the parameters of the image acquisition module by resetting the image acquisition module when it is judged that the change value is greater than the first threshold value, and configure the parameters of the image acquisition module by correcting the image acquisition module when it is judged that the change value is greater than the second threshold value and less than or equal to the first threshold value.

Further, the parameters of the image acquisition module include an illuminating time of the image sensor; and/or an amplification factor of the A/D converter.

Further, the banknote processing device also includes a banknote feeding mechanism which is configured to feed the stacked banknote into the banknote transport passage one by one; the stacked banknote include adjacent first banknote and second banknote, wherein the controller is configured to control the image sensor to scan the first banknote while controlling the image sensor to scan the substrate, judge whether the change value is greater than the preset threshold value, stop transportation of the second banknote if it is judged that the change value is greater than the preset threshold value, and continue transportation of the second banknote if it is judged that the change value is less than or equal to the preset threshold value.

According to another aspect of the present disclosure, a banknote processing device is provided. The banknote processing device includes a scanning unit configured to scan a substrate through the image acquisition module to obtain substrate image data while acquiring banknote image data through the image acquisition module; an acquisition unit configured to acquire a characteristic value of the substrate image data; a calculation unit configured to calculate a change value of the characteristic value of the substrate image data relative to a reference characteristic value; a judging unit configured to judge whether the change value is greater than a preset threshold value; and a configuration unit configured to configure parameters of the image acquisition module when it is judged that the change value is greater than the preset threshold value.

Through the present disclosure, since the substrate is scanned by the image acquisition module to obtain the substrate image data, while the banknote image data is acquired by the image acquisition module, and the parameters of the image acquisition module are configured when the change value of the characteristic value of the substrate image data relative to the reference characteristic value is greater than the preset threshold value, the problem in the existing art that the processing efficiency is relatively low when the banknote identification rate is obviously decreased due to the long-time continuous work of the banknote processing device is solved, and an effect of increasing the working efficiency of the banknote processing device is further achieved.

BRIEF DESCRIPTION OF THE DRAWINGS

The accompanying drawings constituting a part of the present application are intended to provide a further understanding of the present disclosure, and exemplary embodiments of the present disclosure and descriptions thereof are intended to explain the present disclosure and are not to be construed as limitation to the present disclosure. In the accompanying drawings.

DETAILED DESCRIPTION

It should be stated that in the case of no conflict, embodiments in the present application and features in embodiments can be mutually combined. The present disclosure is described below in detail with reference to the drawings and in combination with embodiments.

Figure 1:
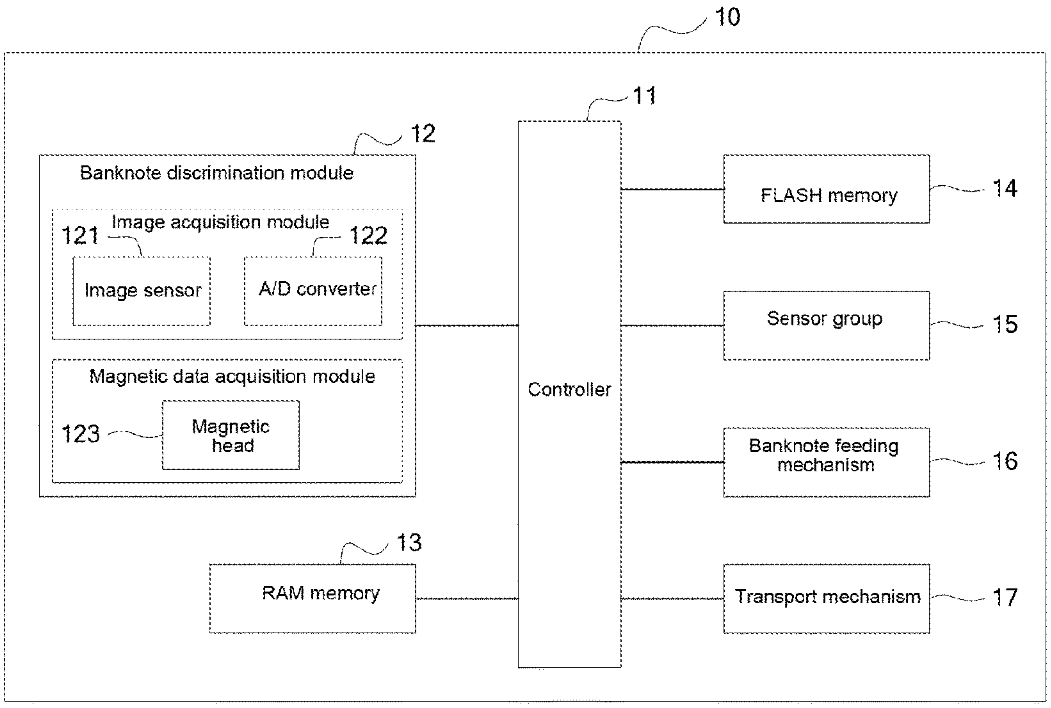
FIG. 1 is a schematic diagram illustrating module composition of a banknote processing device according to an embodiment of the present disclosure.

FIG. 1 is a schematic diagram illustrating module composition of a banknote processing device according to an embodiment of the present disclosure. As shown in FIG. 1, the banknote processing device 10 includes a controller 11, a discrimination mechanism 12, an RAM memory 13, a FLASH memory 14, a sensor group 15, a banknote feeding mechanism 16 and a transport mechanism 17.

The controller 11 controls the work of each composition module; for example, the controller 11 controls the banknote feeding mechanism 16 to gradually separate stacked banknote one by one, controls the transport mechanism 17 to transport the banknote separated by the banknote feeding mechanism, and controls the identification mechanism 12 to acquire image data, magnetic stripe data and the like of the banknote to be processed, and the controller 11 further includes a field-programmable gate array (FPGA); the FPGA is configured to generate a control signal and a clock signal of the discrimination mechanism 12; the FPGA includes a memory control module and an image sensor control module, wherein the memory control module is configured to generate a control signal and a clock signal of the RAM memory 13 and the FLASH memory 14, and the image sensor control module is configured to generate a control signal and a clock signal of the image sensor.

The discrimination mechanism 12 includes an image acquisition module and a magnetic data acquisition module, wherein the image acquisition module includes an image sensor 121 and an A/D converter 122 and is configured to acquire an image of the banknote, wherein the image sensor is configured to acquire an analog image signal of the banknote, and the image sensor may be a CCD and a CIS, utilizes visible light, infrared light or ultraviolet light to illuminate the banknote and receives the light reflected or transmitted by the banknote so as to generate an analog image signal corresponding to the intensity of the reflected or transmitted light; the A/D converter 122 is configured to convert the analog image signal generated by the image sensor 121 into digital image data; and the magnetic data acquisition module includes a magnetic head 123 and is configured to acquire magnetic data on the banknote.

Figure 2:
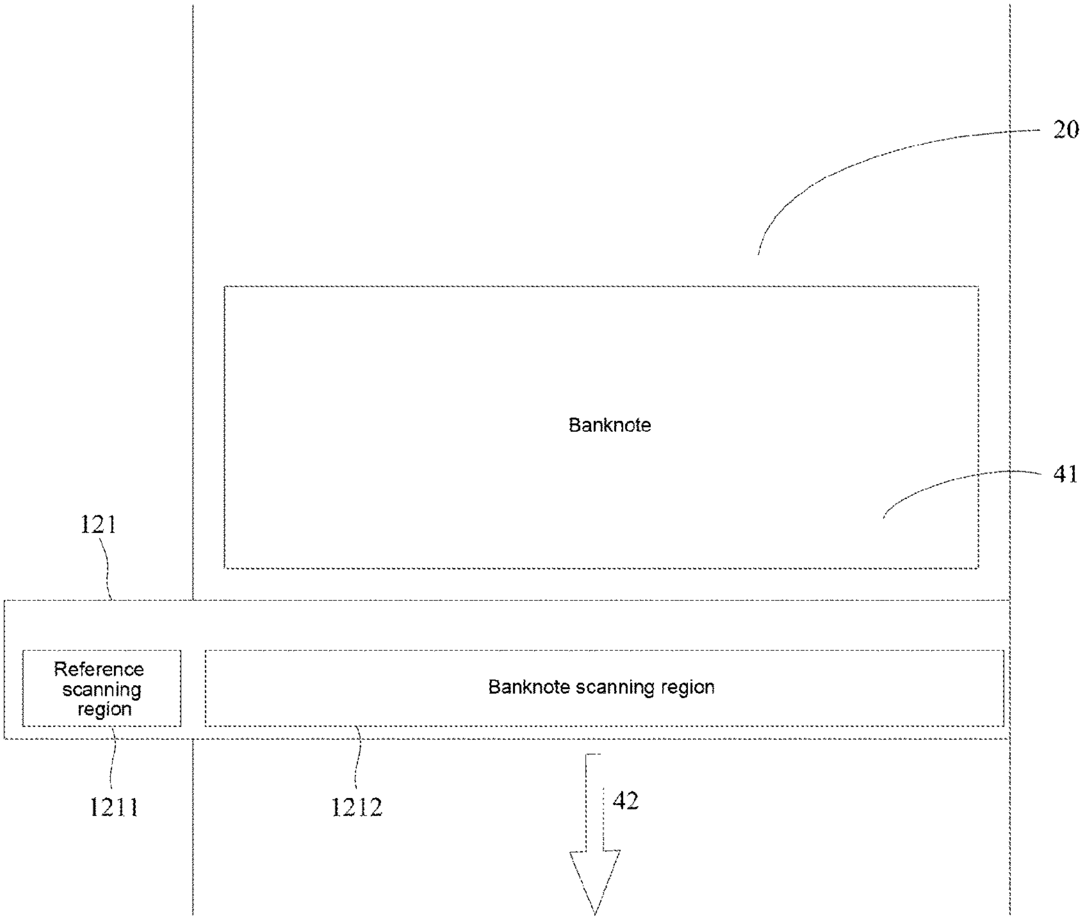
FIG. 2 is a schematic diagram illustrating relative positions of an image sensor and a banknote according to an embodiment of the present disclosure.

FIG. 2 is a schematic diagram illustrating relative positions of an image sensor and a banknote according to an embodiment of the present disclosure. As shown in FIG. 2, the banknote processing device is internally provided with a banknote transport passage 20, and the banknote 41 moves along the direction of an arrow 42 in the banknote transport passage 20. The image sensor 121 includes a banknote scanning region 1212 and a reference scanning region 1211, wherein the banknote scanning region 1212 corresponds to a position of the banknote 41 in the banknote transport passage, the reference scanning region 121 corresponds to a position of the substrate (such as a white plate (not shown in FIG. 2)) of the image sensor 121, and the white plate is configured to correct the illuminating time of the image sensor 121 and arranged on the surface of the image sensor or arranged in the banknote transport passage. When the banknote 41 passes through the image sensor 121, the banknote 41 is scanned by the banknote scanning region 1212 of the image sensor 121 so as to generate the analog image signal of the banknote 41, and the white plate is scanned by the reference scanning region 1211 of the image sensor 121 so as to generate the analog image signal of the white plate.

The RAM memory 13 is configured to store the image data of the banknote, the magnetic data of the banknote, the image data of the white plate, detection data of the sensor group 15 and the like.

The FLASH memory 14 is configured to store a control program of the banknote processing device, the first threshold value, the second threshold value, the reference characteristic value, the deviation threshold value and the parameters of the image acquisition module, wherein the first threshold value is used for judging whether the image acquisition module is abnormal, the second threshold value is used for judging whether the image sensor 121 is abnormal, the reference characteristic value is the characteristic value of the image data acquired by utilizing the reference scanning region 1211 of the image sensor 121 to scan the white plate when the banknote processing device leaves a factory, and the reference characteristic value may be an average value of the acquired image data of the white plate; the deviation threshold value is an allowable deviation value between the characteristic value of the acquired image data of the white plate and the reference characteristic value when the image sensor 121 is corrected; and the parameters of the image acquisition module include the illuminating time of the image sensor, the amplification factor of the A/D converter, etc.

The sensor group 15 includes a plurality of sensors and is configured to detect the position of the banknote in the banknote transport passage 20.

The banknote feeding mechanism 16 is configured to feed the stacked banknote into the banknote transport passage 20 one by one.

The transport mechanism 17 is configured to drive the banknote to move in the banknote transport passage 20.

Figure 3:
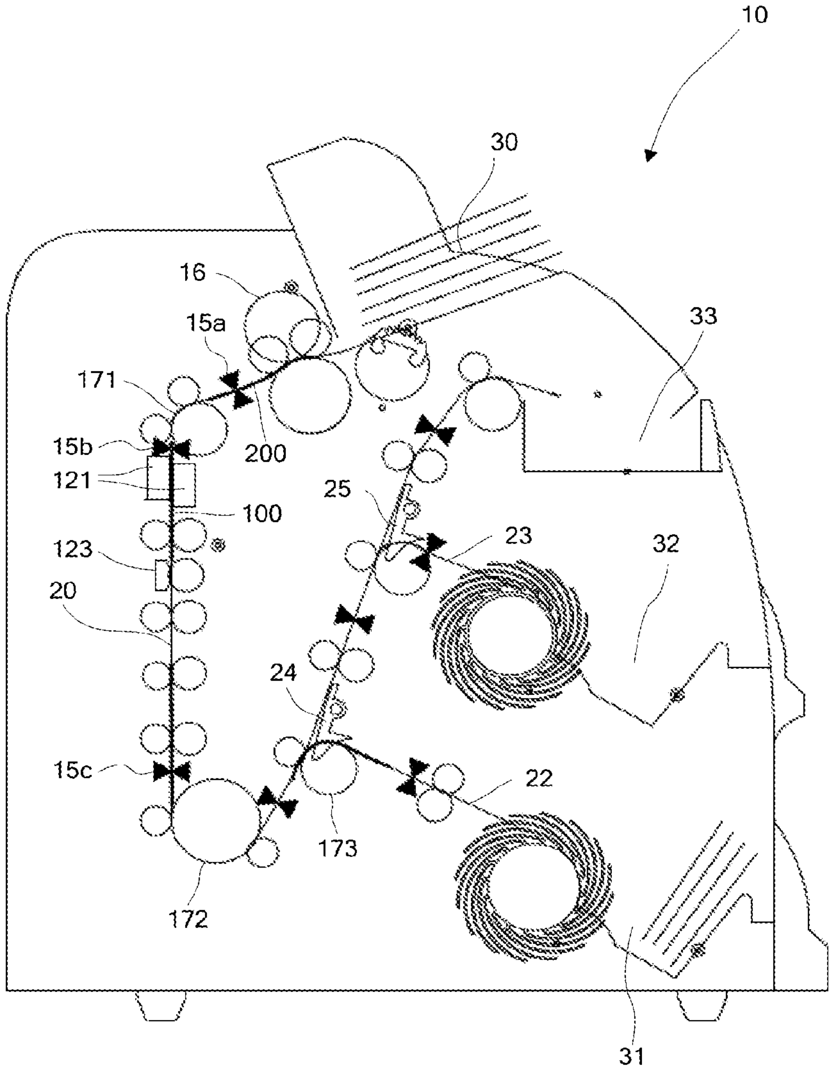
FIG. 3 is a schematic structural diagram illustrating the banknote processing device according to an embodiment of the present disclosure.

FIG. 3 is a schematic structural diagram illustrating the banknote processing device according to an embodiment of the present disclosure. As shown in FIG. 3, the banknote processing device 10 further includes a banknote input receptacle 30, a banknote reject receptacle 33, at least one banknote output receptacle and a diverting mechanism. In the present embodiment, the banknote processing device includes two banknote output receptacles which are respectively a first banknote output receptacle 31 and a second banknote output receptacle 32.

The banknote input receptacle is arranged at a starting end of the banknote transport passage 20 and configured to stack the banknote to be processed; and the banknote feeding mechanism 16 is arranged at the banknote input receptacle 30 and configured to feed the banknote stacked at the banknote input receptacle into the banknote transport passage 20 one by one.

The first banknote output receptacle 31 is connected with the banknote transport passage 20 through a first banknote output passage 22 and configured to stack a first type of banknote identified by the identification mechanism as normal, such as Renminbi with denominations of 100 or 50 Yuan; along the banknote transport direction, the second banknote output receptacle 32 is disposed downstream of the first banknote output receptacle 31, the second banknote output receptacle 32 is connected with the banknote transport passage 20 through a second banknote output passage 23 and configured to stack a second kind of banknote identified by the identification mechanism as normal, such as Renminbi with the denomination of 50 Yuan identified as normal; and the banknote reject receptacle 33 is disposed at the last end of the banknote transport passage 20 and configured to receive the banknote identified by the identification mechanism as abnormal, such as counterfeit banknote or banknote that are not suitable for circulation.

The diverting mechanism includes a first diverting member 24, a second diverting member 25, a first drive member and a second drive member (not shown in the figures), wherein the first diverting member 24 is arranged at a junction of the banknote transport passage 20 and the first banknote output passage 22; the second diverting member 25 is arranged at a junction of the banknote transport passage 20 and the second banknote output passage 23; and the first drive member and the second drive member can be cams or electromagnets, wherein the first drive member is connected with the first diverting member 24, and under the drive of the first drive member, the first diverting member 24 has a first position and a second position. When the first diverting member 24 is disposed at the first position, the banknote transport passage 20 is connected with the first banknote output passage 22, the banknote disposed in the banknote transport passage 20 is sent into the first banknote output passage 22 through the guidance of the first diverting member 24 and discharged via the first banknote output receptacle 31; when the first drive member drives the first diverting member 24 to move to the second position, an access between the banknote transport passage 20 and the first banknote output passage 22 is closed, and the banknote can only continue to move downstream along the banknote transport passage; the second drive member is connected with the second diverting member 25; under the drive of the second drive member, the second diverting member 25 has a first position and a second position, wherein when the second diverting member 25 is disposed at the first position, the banknote transport passage 20 is connected with the second banknote output passage 23, the banknote disposed in the banknote transport passage 20 are sent into the second banknote output passage 23 through the guidance of the second diverting member 25 and discharged via the second banknote output receptacle 32; and when the second drive member drives the second diverting member 25 to move to the second position, an access between the banknote transport passage 20 and the second banknote output passage 23 is closed, the banknote transport passage 20 is connected with the banknote reject receptacle 33, and the banknote in the banknote transport passage is sent into the banknote reject receptacle 33.

The transport mechanism 17 includes a transport roller assembly 171, a transport roller assembly 172 and a transport roller assembly 173 which are distributed along the banknote transport passage 20, wherein the transport roller assembly 171 drives the banknote separated from the banknote feeding mechanism 16 to move towards the image sensor 121.

The sensor group 15 includes a sensor 15*a*, a sensor 15*b* and a sensor 15*c* which are distributed along the banknote transport passage 20, wherein the sensor 15*a* is configured to detect whether a banknote transported from the banknote feeding mechanism 16 exists in the passage, the sensor 15*b* is configured to detect whether the banknote arrives at the image sensor 121, and the sensor 15*c* is configured to detect whether the banknote leaves the image sensor 121.

A banknote processing method according to embodiments of the present disclosure is described below. The banknote processing method according to embodiments of the present disclosure can be executed by the banknote processing device according to embodiments of the present disclosure.

Figure 4:
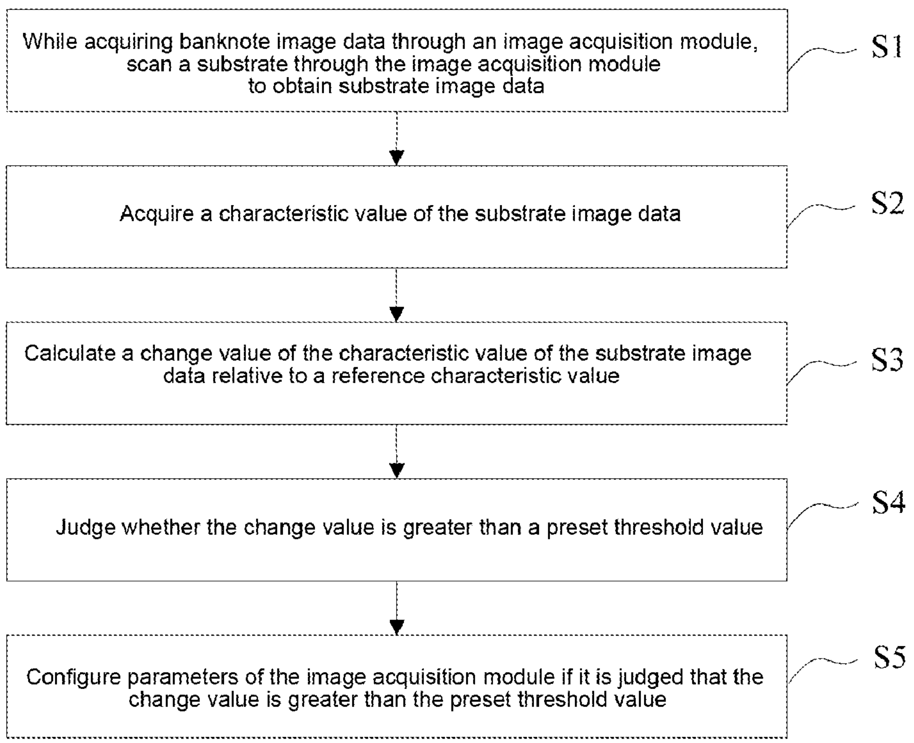
FIG. 4 is a flow chart illustrating a banknote processing method according to an embodiment of the present disclosure.

FIG. 4 is a flow chart illustrating a banknote processing method according to an embodiment of the present disclosure. As shown in FIG. 4, the method includes following steps.

In step S1, while the banknote image data is acquired by an image acquisition module, a substrate is scanned by the image acquisition module to obtain substrate image data.

As shown in FIG. 3, a banknote 100 and a banknote 200 successively enter the banknote transport passage 20 via a banknote input receptacle 30 through a banknote feeding mechanism 16, wherein the banknote 200 is disposed at a sensor 15*a* upstream of the banknote transport passage 20, and the banknote 100 passes through the sensor 15*a* and a sensor 15*b* to arrive at the image sensor 121. When the banknote 100 arrives at the sensor 15*b*, whether a front edge of the banknote 100 arrives at a position where the sensor 15*b* is located is judged by detecting an output signal value of the sensor 15*b*; when the front edge of the banknote 100 arrives at the image sensor 121, the image sensor 121 scans the banknote 100 and a white plate to obtain an analog signal of a banknote image and an analog signal of a white plate image, an A/D converter converts the analog signal of the banknote image into digital banknote image data and converts the analog signal of the white plate image into digital white plate image data.

In step S2, a characteristic value of the substrate image data is acquired; and the substrate image data, such as the white plate image data, is calculated to obtain the characteristic value of the white plate image data, which is called the current characteristic value of the white plate image data. The current characteristic value of the white plate image data may be an average value of the white plate image data.

In step S3, a change value of the characteristic value of the substrate image data relative to a reference characteristic value is calculated.

The change value of the characteristic value of the substrate image data relative to the reference characteristic value may be a difference value between the characteristic value and the reference characteristic value, and may also be a ratio of the difference value between the characteristic value and the reference characteristic value to the reference characteristic value.

In step S4, whether the change value is greater than a preset threshold value is judged.

The change value and the threshold value are consistent in a valuing way; if the threshold value is a gray value, the change value is a change value of an image gray value; and if the threshold value is a ratio value, the change value is a ratio value of the difference value between the characteristic value of the substrate image data and the reference characteristic value to the reference characteristic value.

In step S5, if it is judged that the change value is greater than the preset threshold value, parameters of the image acquisition module are configured.

The preset threshold value in the present embodiment may be one or more preset threshold values. The preset threshold value may include a first threshold value and a second threshold value, and the first threshold value is greater than the second threshold value. In this way, the judging whether the change value is greater than the preset threshold value includes whether the change value is greater than the first threshold value is judged and whether the change value is greater than the second threshold value is judged. When the parameters of the image sensor are configured, if it is judged that the change value is greater than the first threshold value, the parameters of the image acquisition module are configured by resetting the image acquisition module, and if it is judged that the change value is greater than the second threshold value and less than or equal to the first threshold value, an illuminating time of the image sensor and/or an amplification factor of the A/D converter can be configured by correcting the image sensor.

To configure the parameters of the image acquisition module may be to configure the illuminating time of the image sensor, may be to configure the amplification factor of the image sensor, and may also be to configure both the illuminating time of the image sensor and the amplification factor of the A/D converter.

If it is judged that the change value is not greater than the preset threshold value, the parameters of the image acquisition module do not need to be configured.

Figure 5:
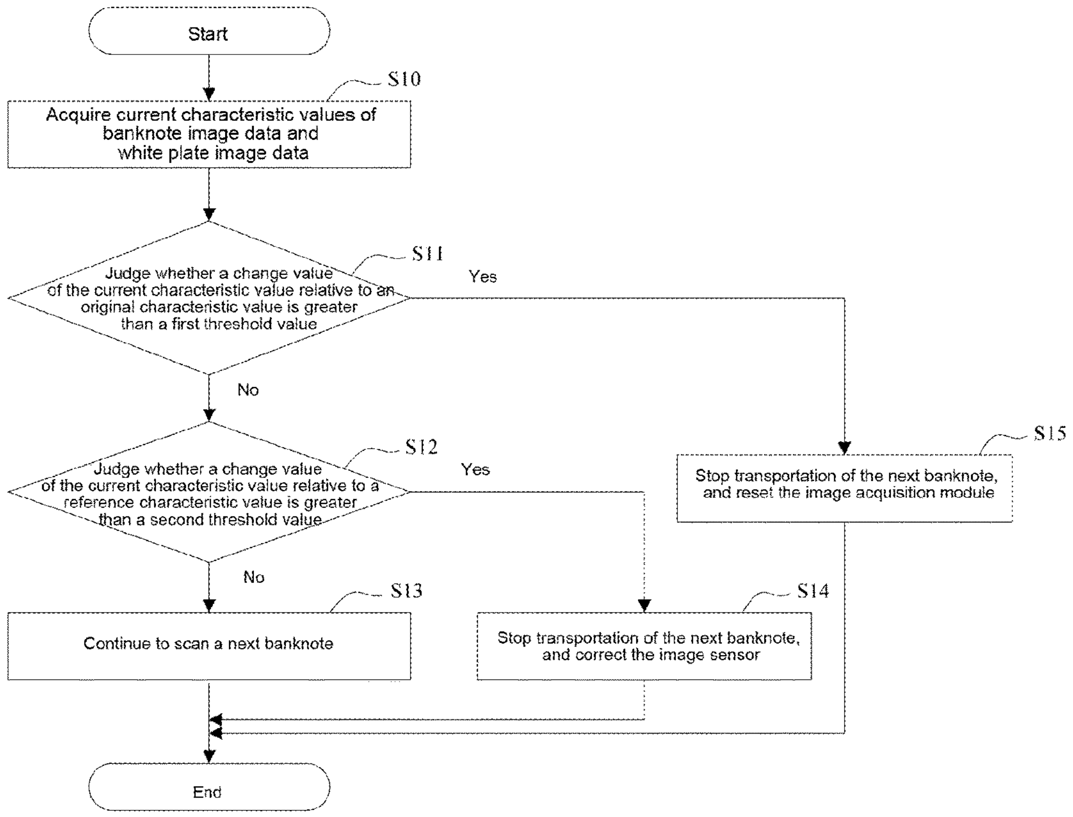
FIG. 5 is a flow chart illustrating the banknote processing method according to another embodiment of the present disclosure.

FIG. 5 is a flow chart illustrating the banknote processing method according to another embodiment of the present disclosure. The present embodiment may be served as an embodiment of the embodiment shown in FIG. 4. As shown in FIG. 5, the method includes following steps.

In step S10, current characteristic values of banknote image data and white plate image data are acquired.

In this step, the current characteristic values of the banknote image data and the white plate image data can be acquired by employing the method in step S1 and step S2 in the above-mentioned embodiment.

In step S11, whether a change value of the current characteristic value of the white plate image data relative to a reference characteristic value is greater than a first threshold value is judged.

The change value of the current characteristic value relative to the reference characteristic value is calculated, whether the change value is greater than the first threshold value is judged, and if the change value is greater than the first threshold value, enter step S15; and if the change value is not greater than the first threshold value, enter step S12.

In step S12, whether the change value of the current characteristic value of the white plate image data relative to a reference characteristic value is greater than a second threshold value is judged.

The change value of the current characteristic value relative to the reference characteristic value is calculated, whether the change value is greater than the second threshold value is judged, and if the change value is greater than the second threshold value, enter step S14; and if the change value is not greater than the second threshold value, enter step S13, wherein the first threshold value is greater than the second threshold value; for example, the first threshold value is 0x50, and the second threshold value is 0x25, or the first threshold value is 25%, and the second threshold value is 10%.

In step S13, a next banknote is subsequently scanned.

As shown in FIG. 3, the banknote 100 and the banknote 200 successively enter the banknote transport passage 20 via a banknote input receptacle 30 through the banknote feeding mechanism 16; along the banknote transport direction, when the banknote 100 is disposed at the image sensor 21, the banknote 200 is disposed upstream of the banknote 100; therefore, if the banknote 100 is set as the current banknote, the banknote 200 disposed upstream of the banknote 100 is the next banknote. In the scanning process of the current banknote 100, if the image sensor works normally, after the controller 11 controls the image sensor 121 to scan the current banknote 100, the transport mechanism 17 drives the next banknote 200 to enter the image sensor 121, and the image sensor 121 scans the banknote 200 and the white plate.

In step S14, transportation of the next banknote is stopped, and the image sensor is corrected.

As shown in FIG. 3, the scanning of the current banknote 100 is continued; after the scanning of the current banknote 100 is ended, transportation of the next banknote 200 is stopped; and the image sensor 121 is corrected so as to obtain a new illuminating time or a new amplification factor of the A/D converter.

In step S15, transportation of the next banknote is stopped, and the image acquisition module is reset.

After the scanning of the current banknote 100 is ended, the controller 11 controls the transport mechanism 17 to be paused, transportation of the next banknote 200 is stopped, and the image acquisition module is reset.

Figure 6:
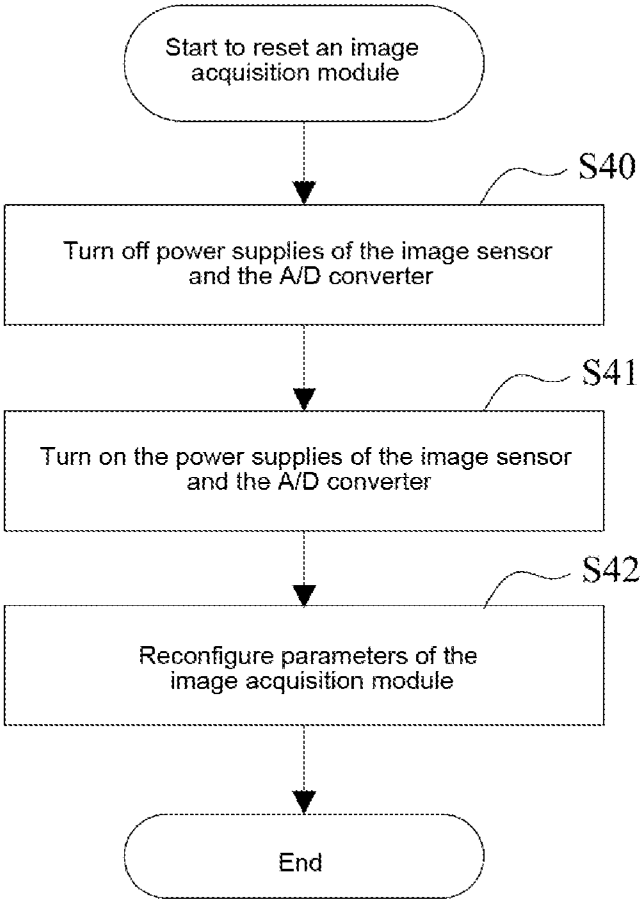
FIG. 6 is a flow chart illustrating resetting of an image acquisition module according to an embodiment of the present disclosure.

FIG. 6 is a flow chart illustrating resetting of an image acquisition module according to an embodiment of the present disclosure. A specific processing course is as follows:

in step S40, power supplies of the image sensor and the A/D converter are turned off.

The controller 11 turns off the power supplies of the image sensor 121 and the A/D converter 122.

In step S41, the power supplies of the image sensor and the A/D converter are turned on.

The controller 11 turns on the power supplies of the image sensor 121 and the A/D converter 122.

In step S42, parameters of the image acquisition module are reconfigured.

To reconfigure the parameters of the image acquisition module may be to reconfigure the amplification factor of the A/D converter, may be to reconfigure the illuminating time of the image sensor, and may also be to reconfigure both the amplification factor of the A/D converter and the illuminating time of the image sensor.

The image sensor 121 includes a plurality of types of light sources (such as visible light, infrared light and ultraviolet light) so as to acquire an image generated by reflecting or transmitting the banknote by different light. When one type of light source is used for illuminating the banknote, the image sensor 121 acquires an analog signal corresponding to the type of the light source, and the analog signal is input to the A/D converter and digitalized after being amplified by the A/D converter; therefore, the configuration parameters of the A/D converter include the amplification factor related to the analog signal of each type of light source; and since the FPGA generates a control signal and a clock signal of the image sensor, to reconfigure the illuminating time of the image sensor is to configure an illuminating time parameter of the image sensor control module in the FPGA, wherein the illuminating time parameter of the image sensor control module in the FPGA includes the illuminating time of each type of light source, the illuminating time may be the illuminating time that is already stored in the FLASH memory 14, and may also be the illuminating time that is acquired when the image sensor is corrected at the previous time after the banknote processing device is powered on; and therefore, reconfiguring the A/D converter and the image sensor includes the amplification factor related to the analog signal of each type of light source in the A/D converter and the illuminating time of each type of light of the image sensor are configured as initial values.

Prior to the reconfiguration of the illuminating time of the image sensor, the control module of the image sensor 121 in the FPGA may also be initialized, so that the control signal and the clock signal of the image sensor 121 are restored to the initial values, thereby eliminating the interference on the control signal and the clock signal of the image sensor 121 caused by the electrostatic interference or temperature rise.

In embodiments of the present disclosure, the interference on the control signal and the clock signal of the image sensor caused by the electrostatic interference or the temperature rise can be eliminated by resetting the image acquisition module, so that the image sensor acquires clear banknote image data, thereby guaranteeing the banknote identification rate of the banknote processing device.

Figure 7:
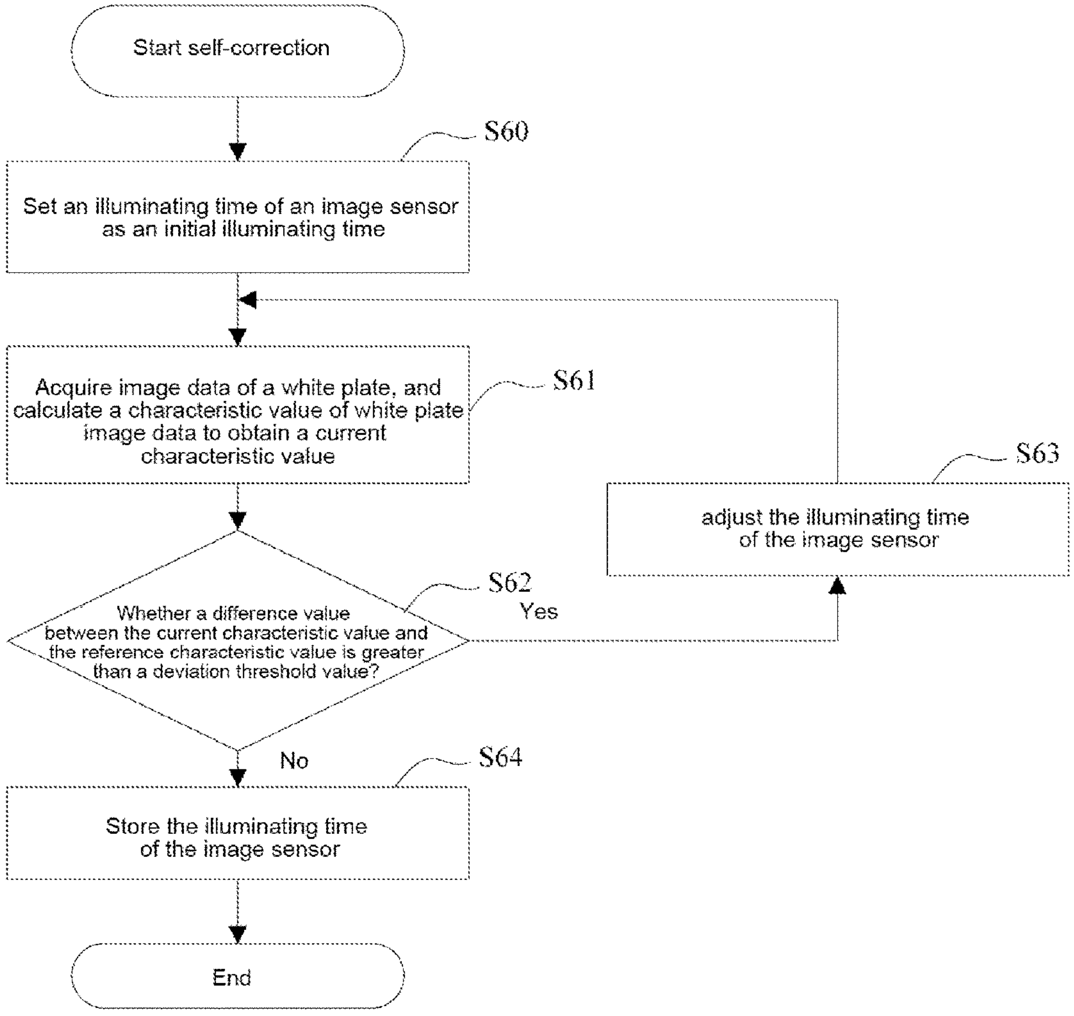
FIG. 7 is a flow chart illustrating correction of the image sensor according to an embodiment of the present disclosure.

FIG. 7 is a flow chart illustrating an image sensor correction method according to an embodiment of the present disclosure. The method includes following steps.

In step S60, an illuminating time of an image sensor is set as an initial illuminating time.

The illuminating time is set as the initial illuminating time, wherein the initial illuminating time may be a minimum illuminating time Tmin of an image sensor light source, and may also be a maximum illuminating time Tmax, wherein the minimum illuminating time Tmin is the illuminating time corresponding to a minimum value (such as gray value) of the image data, and the maximum illuminating time Tmax is the illuminating time corresponding to a maximum value of the image data.

In step S61, the image data of a white plate is acquired, and a characteristic value of white plate image data is calculated to obtain the current characteristic value.

A reference scanning region 1211 scans the white plate to acquire the image data of the white plate, and the characteristic value of the white plate image data is calculated; the characteristic value of the white plate image data may be an average value of the white plate image data, and the calculated characteristic value of the white plate image data is the current characteristic value. Corresponding to each illuminating time, the corresponding image data and the characteristic value of the image data are acquired when the reference scanning region 1211 scans the white plate; if the illuminating time Tx is changed at a minimum unit at every time, which is indicated with ΔT, when the initial illuminating time is Tmin, Tx is (Tmin+ΔT*(x−1)), and when the white plate is scanned with the illuminating time Tx, the corresponding characteristic value Dx of the white plate image data is acquired, Dx is D1, D2, . . . , Dn, wherein x is equal to 1, 2, . . . , n, n is equal to (Tmax-Tmin)/AT, and both x and n are positive integers.

In step S62, whether a difference value between the current characteristic value and the reference characteristic value is greater than a deviation threshold value is judged.

The difference value between the current characteristic value and the reference characteristic value is calculated, and a calculation formula is ΔD=|Dx−Df|, wherein Dx is the current characteristic value, Df is the reference characteristic value, and ΔD is the difference value between the current characteristic value and the reference characteristic value; compared with the reference characteristic value, the preset deviation threshold value is very small; for example, the reference characteristic value is 200, and the deviation threshold value is 4. If ΔD is greater than the deviation threshold value, i.e. the current characteristic value is not close to the reference characteristic value, enter step S63; and if ΔD is not greater than the deviation threshold value, i.e. the current characteristic value is very close to the reference characteristic value, enter step S64.

In step S63, the illuminating time of the image sensor is adjusted.

According to the initial illuminating time, the illuminating time is adjusted with a minimum change unit of the illuminating time, that is, when the initial illuminating time is the minimum illuminating time, the illuminating time is continuously increased from the minimum illuminating time Tmin; and when the initial illuminating time is the maximum illuminating time, the illuminating time is continuously shortened from the maximum illuminating time Tmax. When the initial illuminating time is the minimum illuminating time, the illuminating time Tx may be changed from the current illuminating time (Tmin+ΔT*(x−1)) to (Tmin+ΔT*x), wherein ΔT is the minimum change unit of the illuminating time.

In step S64, the illuminating time of the image sensor is stored.

When the difference value between the current characteristic value and the reference characteristic value is not greater than the deviation threshold value, the current illuminating time of the image sensor is stored in the RAM memory 13 or the FLASH memory 14 as the illuminating time when the image sensor scans the banknote at the next time.

In embodiments of the present disclosure, by correcting the illuminating time of the image sensor, the interference on the image sensor caused by the temperature rise in the banknote processing device and the electrostatic accumulation can be reduced, so that the image sensor acquires clear banknote image data, thereby guaranteeing the banknote identification rate of the banknote processing device.

Figure 8:
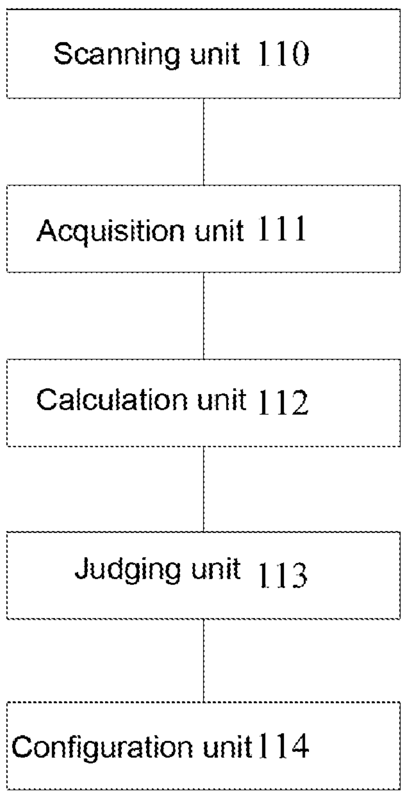
FIG. 8 is a schematic diagram illustrating the banknote processing device according to another embodiment of the present disclosure.

FIG. 8 is a schematic diagram illustrating the banknote processing device according to another embodiment of the present disclosure. The present embodiment may also be used for executing the banknote processing method of embodiments of the present disclosure. As shown in FIG. 8, the banknote processing device includes a scanning unit 110, an acquisition unit 111, a calculation unit 112, a judging unit 113 and a configuration unit 114.

The scanning unit 110 is configured to scan a substrate through an image acquisition module while acquiring the banknote image data through the image acquisition module to obtain substrate image data.

The acquisition unit 111 is configured to acquire a characteristic value of the substrate image data.

The calculation unit 112 is configured to calculate a change value of the characteristic value of the substrate image data relative to a reference characteristic value.

The judging unit 113 is configured to judge whether the change value is greater than a preset threshold value.

The configuration unit 114 is configured to configure an illuminating time of the image sensor when it is judged that the change value is greater than the preset threshold value.

The preset threshold value may include a first threshold value and a second threshold value; the first threshold value is greater than the second threshold value; and the judging unit 113 includes a first judging unit and a second judging unit; the first judging unit is configured to judge whether the change value is greater than the first threshold value; and the second judging unit is configured to judge whether the change value is greater than the second threshold value. The configuration unit includes a first adjusting unit, configured to configure the illuminating time of the image sensor by resetting the image acquisition module when it is judged that the change value is greater than the first threshold value; and a second adjusting unit, configured to configure the illuminating time of the image sensor by correcting the image sensor when it is judged that the change value is greater than the second threshold value and less than or equal to the first threshold value.

The banknote processing method provided by embodiments of the present disclosure acquires the image data of the reference scanning region while acquiring the banknote image data, acquires the characteristic value of the image data of the reference scanning region from the image data of the reference scanning region, and resets the image acquisition module of the banknote processing device or corrects the image sensor according to the change amount of the characteristic value. The banknote processing method provided by the present disclosure can automatically reset the image acquisition module of the banknote processing device or correct the image sensor when necessary. Therefore, the problem that the banknote identification rate is decreased due to the obvious degradation of the image quality caused by the working instability of the image acquisition module due to the continuous scanning of the banknote is prevented; and furthermore, the method does not require the working personnel to regularly pause the work of the banknote processing device, so that the working efficiency of the banknote processing device is increased.

Apparently, those skilled in the art shall understand that each of the above-mentioned modules or steps of the present disclosure may be realized by using a universal computing device. The modules or the steps may be integrated onto a single computing device or may be distributed onto a network consisting of a plurality of computing devices. Optionally, the modules or the steps may be realized by using computing device-executable program codes, so that the modules or the steps may be stored in a storage device and executed by the computing device or the modules or the steps are made into various integrated circuit modules, or multiple modules or steps are made into a single integrated circuit module and implemented. In this way, the present disclosure is not limited to any particular combination of hardware and software.

The above only describes embodiments of the present disclosure, rather than limiting the present disclosure. Those skilled in the art should understand that the present disclosure may be modified and changed in various ways. Any modification, equivalent replacement, improvement and the like made within the spirit and the principle of the present disclosure shall be included in the protection scope of the present disclosure.

What is claimed is:

1. A banknote processing method, comprising scanning a substrate through an image acquisition module to obtain substrate image data while acquiring banknote image data through the image acquisition module;

acquiring a characteristic value of the substrate image data;

calculating a change value of the characteristic value of the substrate image data relative to a reference characteristic value;

judging whether the change value is greater than a preset threshold value; and configuring parameters of the image acquisition module if it is judged that the change value is greater than the threshold value;

wherein the preset threshold value comprises a first threshold value and a second threshold value, wherein the first threshold value is greater than the second threshold value; the judging whether the change value is greater than the preset threshold value comprises:

judging whether the change value is greater than the first threshold value; and judging whether the change value is greater than the second threshold value, wherein when it is judged that the change value is greater than the first threshold value, parameters of the image acquisition module are configured by resetting the image acquisition module, and when it is judged that the change value is greater than the second threshold value and less than or equal to the first threshold value, the parameters of the image acquisition module are configured by correcting the image acquisition module;

wherein the image acquisition module comprises an image sensor and an A/D converter, wherein the A/D converter is configured to convert an analog image signal generated by the image sensor into digital image data, and the parameters of the image acquisition module comprise: an illuminating time of the image sensor; and/or an amplification factor of the A/D converter.

2. The banknote processing method according to claim 1, wherein the image acquisition module is reset in the following way:

turning off power supplies of the image sensor and the A/D converter;

turning on the power supplies of the image sensor and the A/D converter; and reconfiguring the amplification factor of the A/D converter, and/or reconfiguring the illuminating time of the image sensor.

3. The banknote processing method according to claim 1, wherein the image acquisition module is corrected in the following way:

setting an illuminating time of an image sensor as an initial illuminating time;

calculating the characteristic value of the substrate image data to obtain a current characteristic value when the illuminating time of the image sensor is the initial illuminating time;

judging whether the change value of the current characteristic value relative to the reference characteristic value is greater than a preset deviation threshold value;

adjusting the illuminating time of the image sensor if it is judged that the change value of the current characteristic value relative to the reference characteristic value is greater than the preset deviation threshold value; and storing the current illuminating time of the image sensor if it is judged that the change value of the current characteristic value relative to the reference characteristic value is less than or equal to the preset deviation threshold value.

4. The banknote processing method according to claim 1, wherein the banknote processing method is used for successively scanning a first banknote and a second banknote through the image acquisition module, wherein the first banknote is scanned while the substrate is scanned by the image acquisition module, and after judging whether the change value is greater than the preset threshold value, the method further comprises:

stopping transportation of the second banknote if it is judged that the change value is greater than the threshold value; and continuing transportation of the second banknote if it is judged that the change value is less than or equal to the threshold value.

5. A banknote processing device, comprising a banknote transport passage;

a transport mechanism, configured to drive banknote to move in the banknote transport passage;

a discrimination mechanism, comprising an image acquisition module comprising an image sensor and an A/D converter, wherein the image sensor comprises a banknote scanning region and a reference scanning region, the banknote scanning region corresponds to a position of banknote in the banknote transport passage, the reference scanning region corresponds to a position of a substrate; and a controller, configured to control the image sensor to scan the substrate to obtain substrate image data while controlling the image acquisition module to acquire banknote image data, acquire a characteristic value of the substrate image data and a reference characteristic value, calculate a change value of the characteristic value of the substrate image data relative to the reference characteristic value, judge whether the change value is greater than a preset threshold value, and configure parameters of the image acquisition module when it is judged that the change value is greater than the preset threshold value;

wherein the preset threshold value comprises a first threshold value and a second threshold value, and the first threshold value is greater than the second threshold value, the controller is configured to judge whether the change value is greater than the first threshold value and whether the change value is greater than the second threshold value, and configure the parameters of the image acquisition module by resetting the image acquisition module when it is judged that the change value is greater than the first threshold value, and configure the parameters of the image acquisition module by correcting the image acquisition module when it is judged that the change value is greater than the second threshold value and less than or equal to the first threshold value;

wherein the parameters of the image sensor comprise: an illuminating time of the image sensor; and/or an amplification factor of the A/D converter.

6. A banknote processing device, comprising a scanning unit, configured to scan a substrate through an image acquisition module to obtain substrate image data while acquiring banknote image data through the image acquisition module;

an acquisition unit, configured to acquire a characteristic value of the substrate image data;

a calculation unit, configured to calculate a change value of the characteristic value of the substrate image data relative to a reference characteristic value;

a judging unit, configured to judge whether the change value is greater than a preset threshold value; and a configuration unit, configured to configure parameters of the image acquisition module when it is judged that the change value is greater than the preset threshold value, wherein the preset threshold value comprises a first threshold value and a second threshold value, and the first threshold value is greater than the second threshold value;

wherein the judging unit is configured to judge whether the change value is greater than the preset threshold value in the following manner:

judging whether the change value is greater than the first threshold value; and judging whether the change value is greater than the second threshold value, wherein when it is judged that the change value is greater than the first threshold value, parameters of the image acquisition module are configured by resetting the image acquisition module, and when it is judged that the change value is greater than the second threshold value and less than or equal to the first threshold value, the parameters of the image acquisition module are configured by correcting the image acquisition module;

wherein the image acquisition module comprises an image sensor and an A/D converter, wherein the A/D converter is configured to convert an analog image signal generated by the image sensor into digital image data, and the parameters of the image acquisition module comprise: an illuminating time of the image sensor; and/or an amplification factor of the A/D converter.

* * * * *